United States Patent
Hild et al.

(10) Patent No.: US 7,761,554 B1
(45) Date of Patent: Jul. 20, 2010

(54) METHOD AND SYSTEM FOR DESIGNATING REQUIRED DEVICE ATTRIBUTES FOR EMBEDDING IN A WORLD-WIDE WEB DOCUMENT REQUEST

(75) Inventors: Stefan Georg Hild, Adliswil (CH); Sandeep K. Singhal, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 1826 days.

(21) Appl. No.: 09/532,937

(22) Filed: Mar. 22, 2000

(51) Int. Cl.
*G06F 15/173* (2006.01)
(52) U.S. Cl. ............................. 709/224; 709/223
(58) Field of Classification Search .............. 709/200, 709/217–223; 710/33–42; 345/733–763; 717/101; 715/733–763
See application file for complete search history.

(56) References Cited

U.S. PATENT DOCUMENTS

| | | | |
|---|---|---|---|
| 5,754,939 A | 5/1998 | Herz | 455/4.2 |
| 5,778,356 A | 7/1998 | Heiny | 707/2 |
| 5,913,030 A | 6/1999 | Lotspiech | 395/200.33 |
| 5,948,061 A * | 9/1999 | Merriman et al. | 709/219 |
| 6,038,598 A | 3/2000 | Danneels | |
| 6,098,081 A * | 8/2000 | Heidorn et al. | 715/501.1 |
| 6,138,155 A * | 10/2000 | Davis et al. | 709/224 |
| 6,144,944 A * | 11/2000 | Kurtzman et al. | 705/14 |
| 6,163,799 A * | 12/2000 | Kambayashi et al. | 709/204 |
| 6,268,856 B1 * | 7/2001 | Bruck et al. | 345/733 |
| 6,279,030 B1 * | 8/2001 | Britton et al. | 709/203 |
| 6,298,356 B1 * | 10/2001 | Jawahar et al. | 707/201 |
| 6,314,457 B1 * | 11/2001 | Schena et al. | 709/219 |
| 6,401,085 B1 * | 6/2002 | Gershman et al. | 707/4 |
| 6,496,855 B1 * | 12/2002 | Hunt et al. | 709/217 |

FOREIGN PATENT DOCUMENTS

| | | |
|---|---|---|
| GB | 2331600 | 5/1999 |
| JP | 09245053 | 9/1997 |
| JP | 10222357 | 8/1998 |
| JP | 11055324 | 2/1999 |
| JP | 11175476 | 2/1999 |
| JP | 11242702 | 9/1999 |
| JP | 11265310 | 9/1999 |
| JP | 057157 | 2/2000 |
| WO | 0011850 | 3/2000 |

OTHER PUBLICATIONS

Michael, Koch, Class User Profile, Date: Apr. 16, 2002 09:01:45, http://wwwschlichter.in.tum.de/proj/cobricks/intern/javadoc/de/tum/cobricks/id/storage/UserProfile.html.*

* cited by examiner

*Primary Examiner*—David E England
(74) *Attorney, Agent, or Firm*—Jeanine S. Ray-Yarletts (57) ABSTRACT

A Web server indicates which device, user, software, and network properties it can use to generate personalized content for a requesting user. The Web server also indicates which properties are actually required for it to generate any meaningful content at all. Using this mechanism, the client can optionally query the user for permission before including requested information in the request. Furthermore, the client device can save network bandwidth by only transmitting information that the server will use.

36 Claims, 7 Drawing Sheets

```
                    ╱240
<HTML>
                 242    245          246
<body>          ╱      ╱            ╱
This is a <A HREF="http://www.ibm.com"
 244                 TYPE ="text/html">
  ↓                    ↑       ↑
link </A>             247     248
         ↖243

</body>

</html>
       ↖241
```

FIG. 4A

```
           ╱250
<wml>

<card>
             This is card 1   ╱253
  252↘      <A HREF"=#card2">Jump to card 2</A>

</card>
       <card id ="card 2" >     ╱255
             Link to <A HREF="deck2.wml"
                    ↗
                 254
                            SENDREFERER = "TRUE">
             deck2</A>          ↑
       </card>                 256
</wml>↘
        251
```

FIG. 4B

```
                 ,-341 342,343
                    ↘  ↘  ↓
<A HREF="http://www.ibm.com/index.html"

PROFILEATTRS = "HardwareCharacteristics:Screensizes"
     ↗                        ↘              ↙
   344                        346           347
                                 |
                                345

```
       <A HREF="http://www.ibm.com/index.html"
      ↗                                      ,-352
    350
        PROFILEATTRS = "HardwareCharacteristics:Location;
      ↗                SoftwareCharacteristics:*" >
    351                       ↗
                            353

```
       <A HREF = "http://www.ibm.com/index.html"
       ↗              377 ↘
     375 PROFILEATTRS = !HardwareCharacteristics:Location;
       ↗               HardwareCharacteristics:ScreenSize" >
     376                   ↗
                         378

METHOD AND SYSTEM FOR DESIGNATING REQUIRED DEVICE ATTRIBUTES FOR EMBEDDING IN A WORLD-WIDE WEB DOCUMENT REQUEST

FIELD OF THE INVENTION

This invention relates in general to computer software, and in particular to a method and system for requesting device-specific information to be included in a World Wide Web document request. More particularly, the present invention relates to a method and system by which a server may designate which device attributes does it require to support the dynamic customization of the retrieved Web document.

BACKGROUND OF THE INVENTION

The World-Wide Web provides a mechanism by which users can retrieve documents from servers. Users run Web browsers, such as Netscape Navigator (Navigator is a trademark of Netscape Communications Corporation) or Internet Explorer (Internet Explorer is a trademark of Microsoft Corporation) on desktop computers. These browsers use the Hyper-Text Transfer Protocol (HTTP) to issue requests to servers for particular documents or other content. (It should be noted that the World-Wide Web supports the use of several alternative protocols, including the File Transfer Protocol (FTP) and Gopher protocol.)

Upon receiving these browser requests, the server locates the document and returns it to the browser which, in turn, renders it for the user. These documents are typically authored in the Hyper-Text Markup Language (HTML), though other markup languages such as the Wireless Markup Language (WML), Voice Markup Language (Voice XML), and eXtensible Markup Language (XML) are in common use.

Modern Web servers can also generate documents dynamically based on information contained in the request about the particular user and the particular browser making the request. For example, the User-Agent header in the HTTP protocol typically carries the identity of the browser software from which the request originated. Additional information in the HTTP protocol can identify the user. At the Web server, a Common Gateway Interface (CGI) program, Active Server Page (ASP) program, or Java servlet can analyze the User-Agent and user information to select which content to include in the returned document and to determine how best to format the returned document. This concept of personalization is vital to today's Web because it ensures that users receive desired information in a form that is best shown on the client browser. However, existing methods of personalization are also limited because they require the server software to explicitly handle each type of browser independently.

Currently, there is a proliferation of new types of Web-connected devices, including wireless laptops, cellular phones, personal digital assistants (PDAs), automotive computers, intelligent household appliances, and home gateways. These devices have widely varying user interface capabilities, installed software, and network connectivity. As the number of browsers is growing, servers are burdened with the increasingly complex task of personalizing content for each of these different devices.

New standards are emerging to allow devices to describe their user interface capabilities, installed software, user preferences, and network connectivity in more abstract ways. The Composite Capability and Preference Profiles (CC/PP) specification published by the World-Wide-Web Consortium (W3C) describes a framework for providing this information within each HTTP request. The Wireless Application Protocol (WAP) Forum has defined a similar method (called User Agent Profiles, or UAProf) for describing this information within each Wireless Session Protocol (WSP) request. (The WSP is a form of HTTP that has been optimized for use over low-bandwidth wireless networks.)

As the range of available client information grows, it can become impractical for a device to provide all of that information with each request. Moreover, a user who is sensitive to privacy may not want client information to be provided within every Web document request. However, with today's technology, there is no way for a server to indicate which client characteristics does it actually use or require for dynamically generating personalized content for the device. Consequently, a client must simply include its entire profile with every request to ensure that the server receives the information that it needs.

Therefore, a need exists for a method and system that allows Web servers to indicate which device, user, software, and network properties can it use to generate personalized content for the requesting user. The Web server also needs to indicate which properties are actually required for it to generate any meaningful content at all. Using this mechanism, the client can optionally query the user for permission before including the requested information in the request. Using this mechanism, the client furthermore can save network bandwidth by only transmitting information that the server will use.

SUMMARY OF THE INVENTION

An object of the present invention is to provide, within a networked environment, a method by which a Web server can indicate which device, user, software, and network properties can it use when generating personalized content for the requesting user.

Another object of the present invention is to provide a method by which a Web server can indicate which device, user, software, and network propreties are required for it to generate any meaningful content for the requesting user.

Yet another object of the present invention is to allow servers to describe which client properties are used or required within the context of existing markup languages, so that existing browsers are not negatively impacted by the presence of this information.

Yet another object of the present invention is to provide a method by which the client can query the user before providing potentially sensitive information to a requesting Web server.

Yet another object of the present invention is to provide a method for reducing the amount of network bandwidth consumed to transmit device, user, software, and network information that is not used by the Web server.

To achieve the foregoing objects and in accordance with the purpose of the invention as broadly described herein, a method and system are disclosed for annotating markup language links, or anchors, with information about the client properties that are used or required by the Web server. Using this information, the client can determine which properties to transmit with the link request, optionally querying the user before transmitting private information. These and other features, aspects, and advantages of the present invention will become better understood with reference to the following description, appended claims, and accompanying drawings.

BRIEF DESCRIPTION OF THE DRAWINGS

For a more complete understanding of the present invention and for further advantages thereof, reference is now made to the following Detailed Description taken in conjunction with the accompanying drawings, in which:

FIGS. 5A, 5B, and 5C show link elements that have been annotated with requested client properties, in accordance with the present invention;

DETAILED DESCRIPTION OF THE INVENTION

Figure 1:
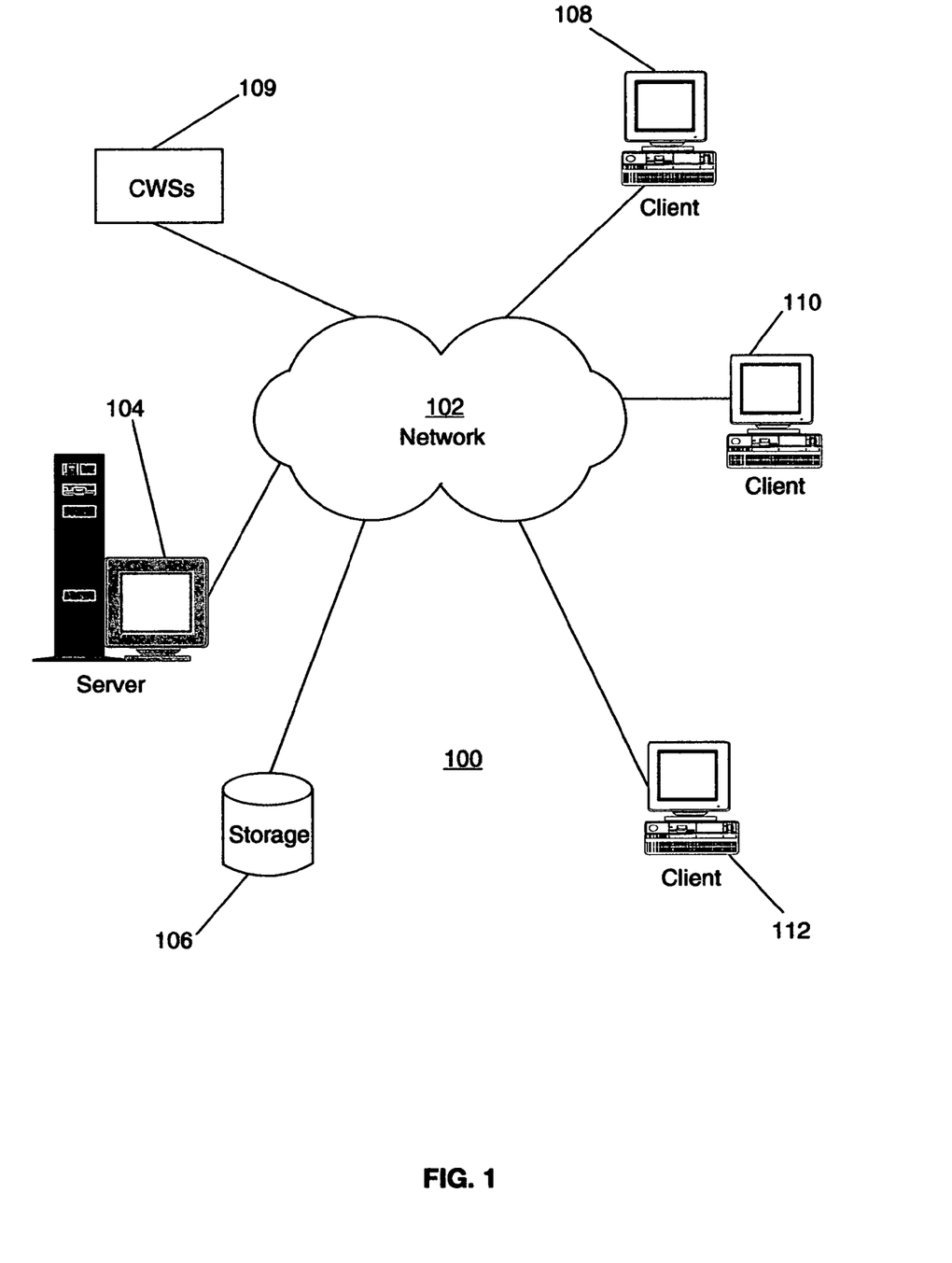
FIG. 1 is a pictorial representation of a distributed data processing system which may be utilized to implement the present invention.

With reference now to the figures, FIG. 1 depicts a representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage Unit 106. In addition, a group of cooperating web servers CWSs 109 is connected to network 102. Clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108-112. Clients 108, 110, and 112 are clients to server 104. For the purposes of this description, a non-transitory computer readable storage medium can be any apparatus that can contain or store, programs and/or code for use by or in connection with processor, apparatus or devices. Examples of a non-transitory computer readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. Users located at these clients may, for example, without limitation, access various resources through browsers.

Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is the backbone of high-speed data communication lines between major nodes or host computers, consisting of thousands of commercial, government, educational, and other computer systems that route data and messages. Of course, distributed data processing system 100 also may be implemented as a number of different types of networks, such as, for example, an Intranet, a local area network (LAN), or a wide area network (WAN). FIG. 1 is intended as an example, and not as an architectural limitation for the processes of the present invention.

Figure 2:
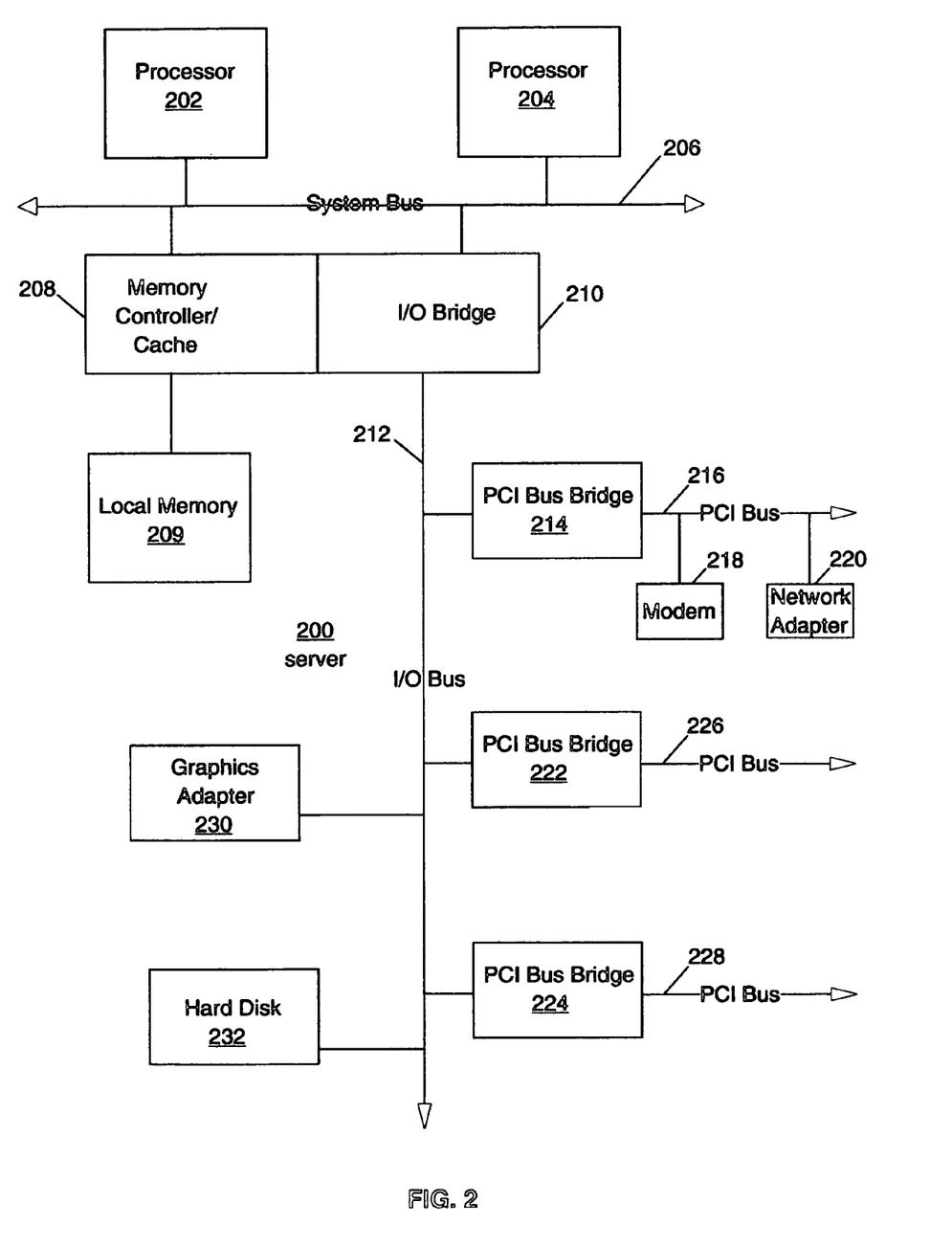
FIG. 2 is a block diagram depicting a data processing system, which may be implemented as a server in accordance with the present invention.

Referring to FIG. 2, a block diagram depicts a data processing system, which may be implemented as a server, such as server 104 in FIG. 1, in accordance with the present invention. Data processing system 200 maybe a symmetric multiprocessor (SMP) system including a plurality of processors 202 and 204 connected to system bus 206. Alternatively, a single processor system may be employed. Also connected to system bus 206 is memory controller/cache 280, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218-220 may be connected to PCI bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drive and the like, also may be used in addition to or in place of the hardware detected. The depicted example is not meant to imply architectural limitations with respect to the present invention.

The data processing system depicted in FIG. 2 may be, for example, an IBM RISC/System 6000 system, a product of International Business Machines Corp. in Armonk, N.Y., running the Advanced Interactive Executive (AIX) operating system.

Figure 3:
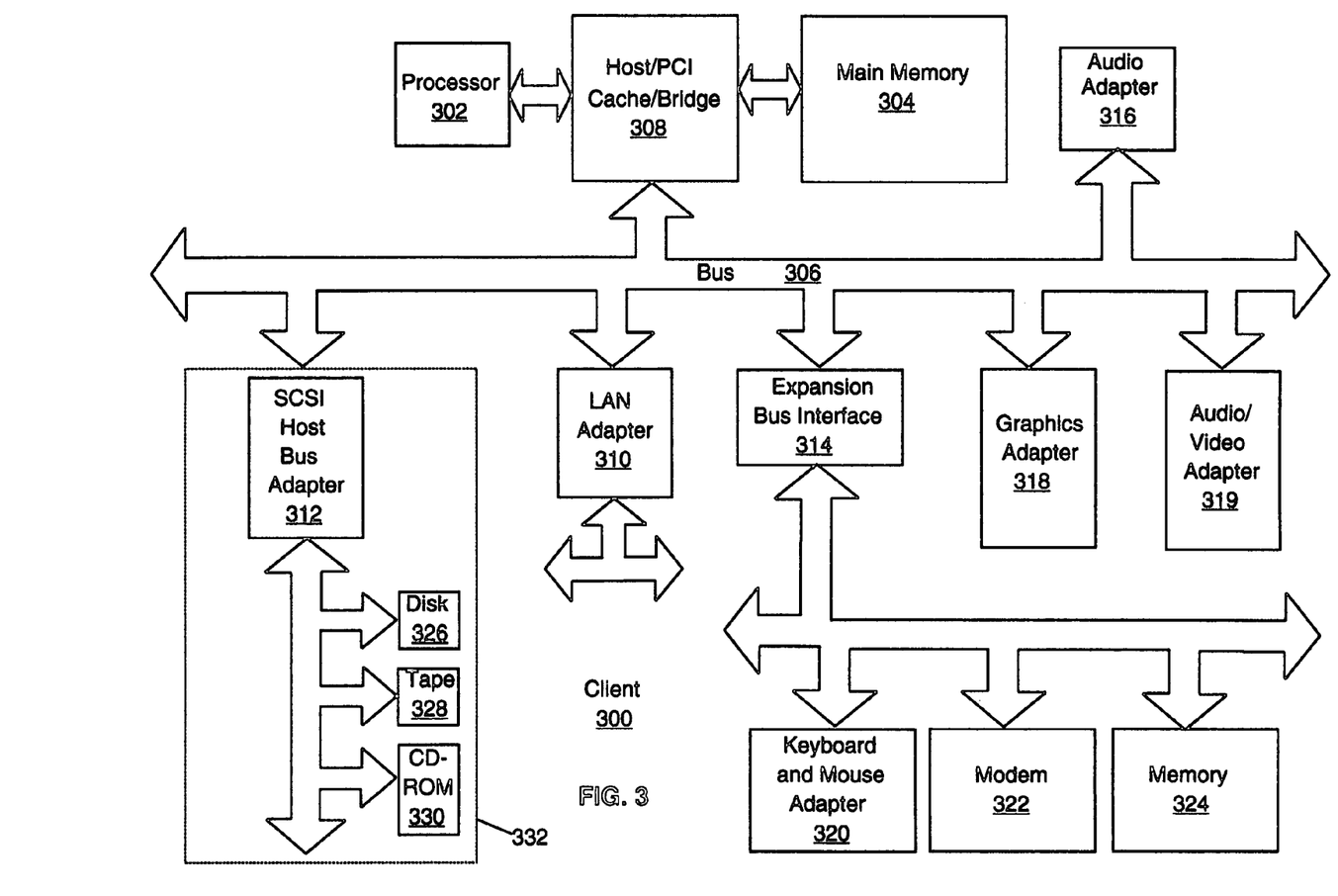
FIG. 3 is a block diagram illustrating a data processing system in which the present invention may be implemented.

With reference now FIG. 3, a block diagram illustrates a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Micro Channel and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as OS/2, trademark of International Business Machines Corporation. An object oriented programming system, such as Java, a trademark of Sun Microsystems, Inc., may run in conjunction with the operating system and provides calls to the operating system from the Java programs or applications executing on data processing system 300. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by the box with the dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user generated data.

The depicted example in FIG. 3 and above-described examples are not meant to imply architectural limitations with respect to the present invention. Although FIGS. 1-3 provide examples of configurations of computer systems on which the present invention may execute, the following background information may provide a context for understanding the overall computing environment in which the present invention may be used.

Software program code which employs the present invention is typically stored in the memory of a storage device 232 of a stand-alone workstation or LAN server from which a developer may access the code for distribution purposes, the software program code may be embodied on any of a variety of known media for use with a data processing system such as a diskette or CD-ROM or may be distributed to users from a memory of one computer system over a network of some type to other computer systems for use by users of such other systems. Such techniques and methods for embodying software code on media and/or distributing software code are well-known and will not be further discussed herein.

Figure 4A:
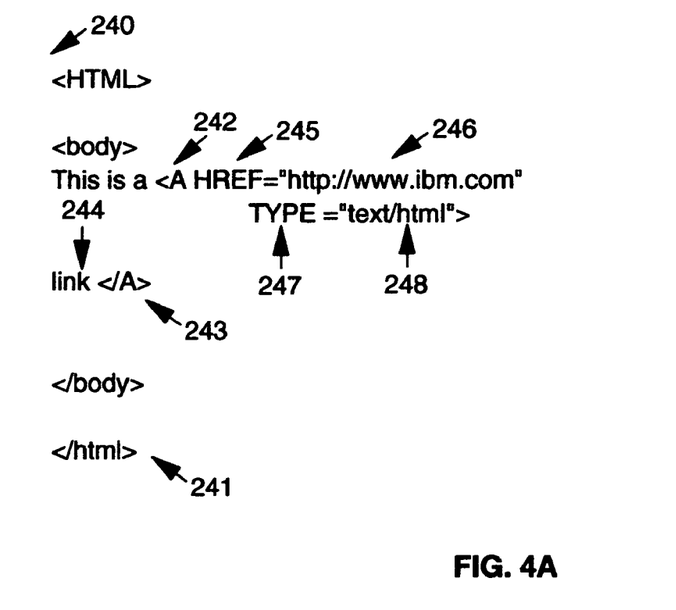
FIGS. 4A and 4B show sample HTML and WML documents including links for retrieving other Web documents.

Documents written in Web-based markup languages, such as HTML and WML, typically contain elements that represent pointers, or links, to other documents. Referring now to FIG. 4A, there is shown an example of a document written in the Hyper-Text Markup Language (HTML), as indicated by the start tag 240 and end tag 241. In HTML, for example, document links are indicated by an ANCHOR, or "A", tag 242. The text 244 between the "A" tag 242 and the terminating </A> tag 243 is typically displayed by the browser in a special color or font to indicate that the user may click on it to retrieve the document referred to by the anchor link. The anchor link element 242 typically includes a plurality of attributes (245, 247) describing the link. The HREF attribute 245 describes the identity 246 of the document being referenced by the anchor. The HREF attribute 245 is mandatory within an "A" element. The TYPE attribute 247 is optional within an "A" element and describes the type or format 248 of the linked document. Other attributes may also be included within the "A" element in accordance with the HTML specification. It is understood that, in accordance with the HTML specification, formatting of the document is not significant and tag names, elements, and attributes may be in upper or lower case.

Figure 4B:
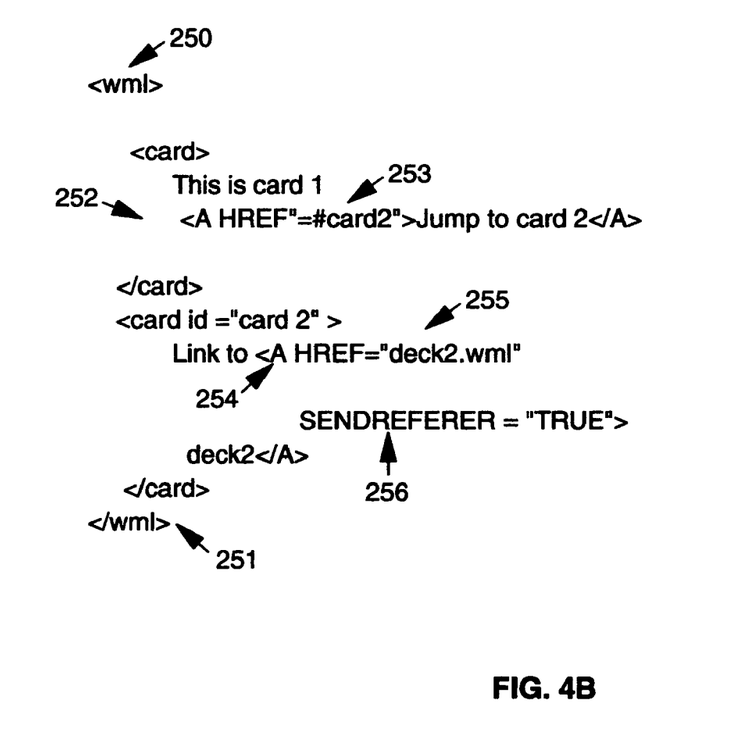

Referring now to FIG. 4B, there is shown a document written in the Wireless Markup Language (WML), as indicated by the tags 250 and 251. This document contains two "A" links 252 and 254. Link 252 includes an HREF attribute 253 pointing to the second card in the document. Link 254 includes an HREF attribute 255 pointing to another document, deck2.wml. The optional SENDREFERER attribute 256 instructs the browser to include the current document name within the request to retrieve the linked document. Again, it is understood that WML documents may be formatted in many ways, in accordance with the WML specification.

Though not shown, it is understood that Web documents may be written in a multitude of different markup languages. Each of these languages may include designated tags for linking to other documents. Within these tags, the document author may include a plurality of mandatory and optional attributes that provide the client with additional information about how the linked document should be retrieved.

The server may need to indicate to the client browser that the server that provides a particular linked document is capable of customizing the content or format of that document according to the client as long as the document request includes information about the hardware device, platform or application software, or user preferences. To do this, the server may include an additional attribute (PROFILEATTRS) with the link element listing the properties that the referenced server can use to customize the referenced document.

The HTML specification allows for additional attributes to be included within a particular element, such as the "A" tag. Browsers that do not recognize the additional attributes are expected to simply ignore that information. However, browsers that do recognize the attribute may take special function. Therefore, the PROFILEATTRS attribute does not disrupt existing browsers but does allow new browsers to recognize the requested client properties and take appropriate action, as discussed with FIG. 7 below.

Referring now to FIG. 5A, there is shown a link element 341 that contains an HREF attribute 342 pointing to the document "http://www.ibm.com/index.html" 343. The optional attribute PROFILEATTRS 344 designates a list of client properties 345 that may be provided to the server from which the document 343 is requested. The list 345 includes only one property. The property is designated by a category HardwareCharacteristics 346, followed by a colon, followed by a property name ScreenSizes 347. Additional properties may be included in the list 345 by separating them with a semi-colon.

Referring now to FIG. 5B, there is shown a link element 350 containing a PROFILEATTRS attribute 351. The property list contains multiple values 352 and 353, separated by semi-colons. The first value 352 indicates that the client may provide the Location property within the HardwareCharacteristics group. The second value 353 indicates that the server can make use of any properties within the SoftwareCharacteristics group. The asterisk (*) indicates a "wild card" for properties within the group.

Referring now to FIG. 5C, there is shown a link element 375 containing a PROFILEATTRS attribute 376. The property list contains multiple values 377 and 378, separated by a semi-colon. The first value 377 indicates that the client may provide the Location property within the HardwareCharacteristics group. However, this property is preceded by an exclamation point, which indicates that the server cannot generate the requested document unless the client provides this property value. In other words, the client must provide this property value in order to receive the linked document; if the client is unable or unwilling to provide this property, it should not attempt to retrieve the document because the server is unable to deliver a response document unless it receives this information. The second value 353 indicates that the server can make use of the ScreenSize property in the HardwareCharacteristics group. Because this property is not preceded by an exclamation point, the attribute is deemed to be optional; the server can use the property if it is provided, but it does not require the information in order to generate the referenced document.

Though FIGS. 5A, 5B, and 5C show links annotated in a particular way, it is understood that alternative embodiments of this invention may employ a variety of different formats, including different attribute names (other than PROFILEATTRS), different syntax for listing requested properties, or different syntax for designated wild cards or mandatory attributes. It is understood that these alternative embodiments do not take away from the inventive constructs herein.

When the user selects a link that has been annotated with a PROFILEATTRS attribute, the browser software is responsible for determining the set of requested properties to provide and for subsequently generating a request for the linked document, embedding the selected set of properties within the request. In determining which requested properties to provide, the client may optionally query the user for confirmation that this information may be released. This is particularly appropriate when the requested client properties are deemed confidential or sensitive.

Figure 6:
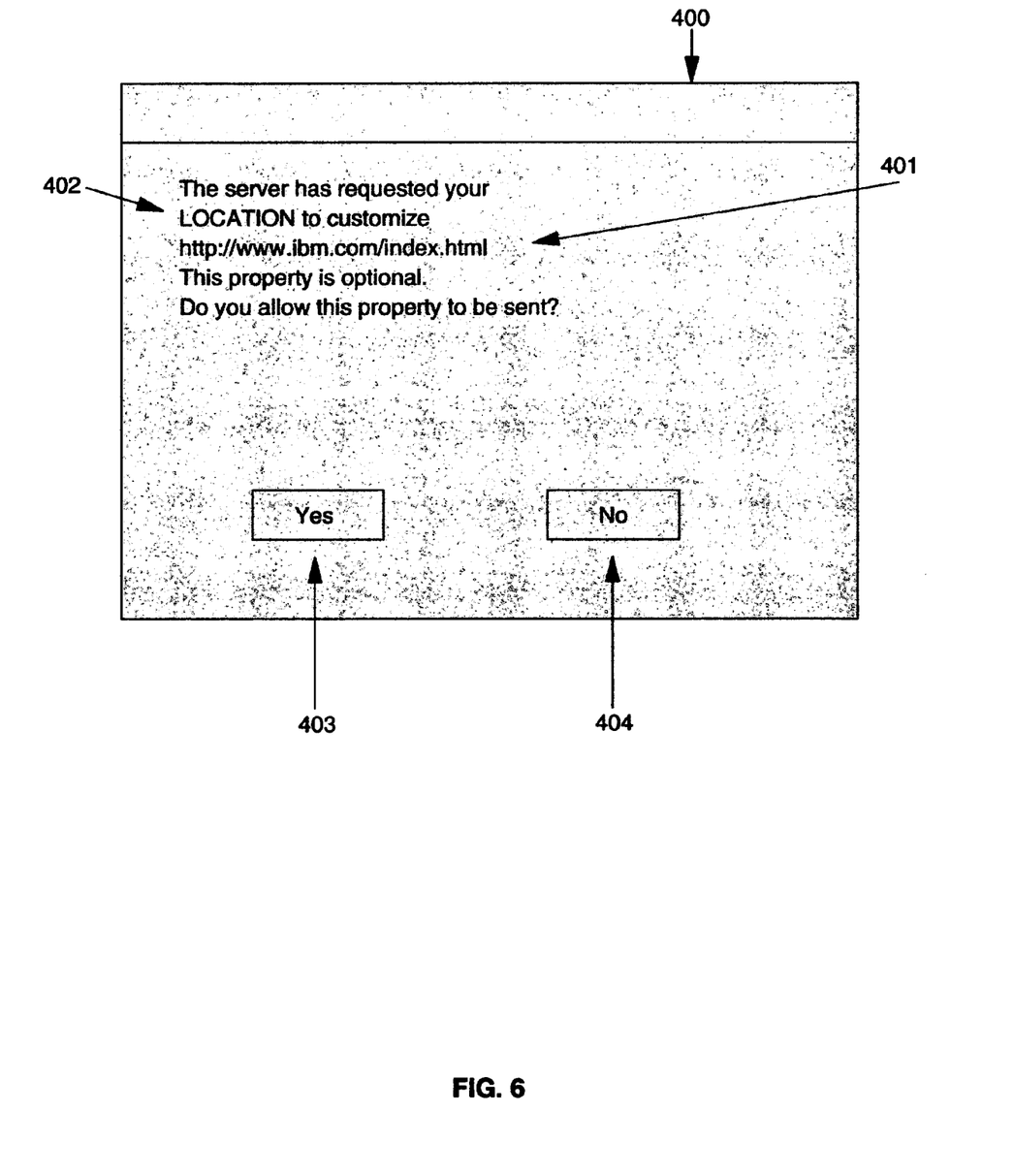
FIG. 6 is a sample dialog querying the user whether to include a particular property with a linked document request, in accordance with the present invention.

Referring now to FIG. 6, there is shown a user interface dialog querying the user whether a particular property should be included with a request to a linked document. The dialog 400 includes at least the linked document location 401, the particular property being requested 402, and selection widgets 403 and 404 allowing the user to indicate that the property should or should not be transmitted. Though FIG. 6 illustrates a particular embodiment of the query dialog, it is understood that alternative implementations may present this dialog in other formats, which may include a voice-based interface. These alternative interface embodiments do not take away from the inventive concepts herein.

Figure 7:
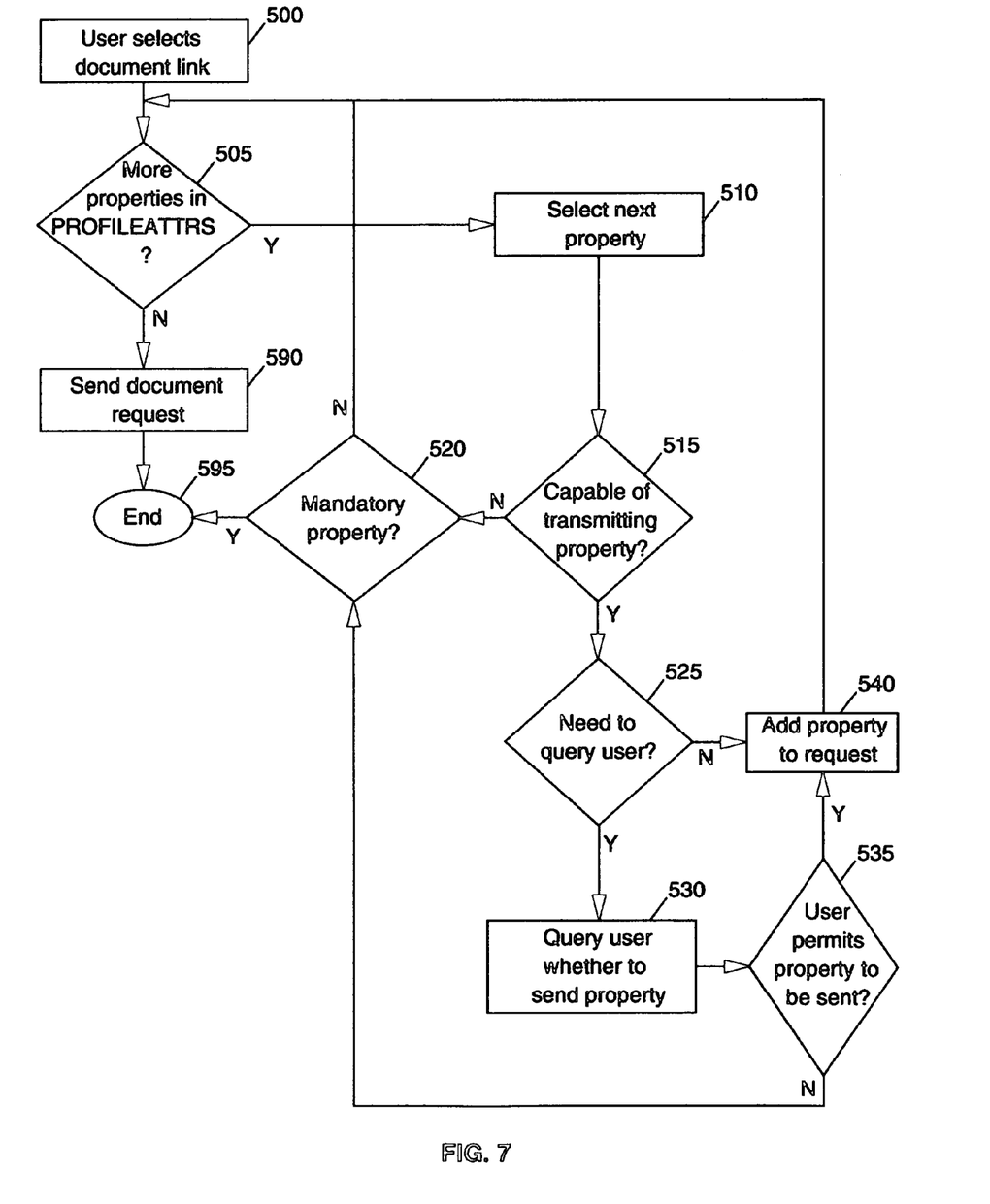
FIG. 7 is a flowchart depicting the processing performed at the client when the user chooses to follow an annotated link, in accordance with the present invention.

Referring now to FIG. 7, there is shown a flowchart depicting the steps executed by the client when the user selects a document link that has been annotated with the PROFILEATTRS attribute. At block 500, the user selects a document link that has been annotated with the PROFILEATTRS attribute, and the transmission properties list is initialized to be empty. At decision block 505, it is determined whether there are any more properties listed within the PROFILEATTRS attribute. (It is understood that if a listed property is a wildcard, then this property is expanded into a list of all matching property names for the purpose of decision block 505 and block 510, discussed below.) If the answer to decision block 505 is no, then processing proceeds to block 590, where the document request is sent, along with the transmission properties. Processing then terminates at block 595.

Continuing with FIG. 7, if the answer to decision block 505 is yes, then at block 510, the next property in the PROFILEATTRS list is selected (again assuming that the wildcard is expanded into its individual properties). At decision block 515, the client determines whether it is capable of transmitting the selected property. If the answer to decision block 515 is no, then control passes to decision block 520 where it is determined whether the selected property is mandatory. If the answer to decision block 520 is no, then control returns to decision block 505 where the next property is processed. If the answer to decision block 520 is yes, then it is determined that the request cannot be successfully transmitted because a mandatory property is unavailable. Control passes to block 595, where the process is terminated.

Continuing with FIG. 7, if the answer to decision block 515 is yes, then control passes to decision block 525, where it is determined whether the user needs to be queried to confirm whether to provide the selected property with the request. This determination may be performed by accessing a configuration file or database on the client. If the answer to decision block 525 is yes, then at block 530, the user is queried for permission to include the property with the linked document request. This query may take the form of a dialog, such as the one shown above in FIG. 6. At decision block 535, it is determined whether the user agreed to transmit the property with the request. If the answer to decision block 535 is no, then control proceeds to decision block 520 where denied mandatory properties cause the request to be terminated.

Continuing with FIG. 7, if the answer to decision block 525 is no (the user does not need to be prompted) or the answer to decision block 535 is yes (the user agrees that the property may be transmitted with the linked document request), then control proceeds to block 540. At block 540, the selected property is inserted into the list of transmission properties for later insertion into the linked document request. Control then returns to decision block 505 where the next property is processed.

In this way, a client includes the requested properties with the document request, confirms property inclusion with the user where appropriate, and terminates the request if a mandatory property cannot be (or is not permitted to be) sent.

Although the present invention has been described with respect to a specific preferred embodiment thereof, various changes and modifications may be suggested to one skilled in the art and it is intended that the present invention encompass such changes and modifications as fall within the scope of the appended claims.

We claim:

1. In a networked environment, a method, performed in a hardware processor, for designating client properties comprising:

receiving a link element associated with a server, the link element including a plurality of requested client properties;

selecting said link element to request a document identified by the link element to be transmitted to a client; and inserting at least one of said plurality of requested client properties into the request so as to allow customization of the requested document identified by the link element based on the inserted at least one of said plurality of requested client properties.

2. The method of claim 1, wherein said plurality of requested client properties is contained within an attribute of said link element.

3. The method of claim 1, wherein said plurality of requested client properties includes at least one property that is a wild card.

4. The method of claim 1, wherein said step of inserting comprises the steps of:

selecting ones of the plurality of requested client properties included in the link element; and determining whether selected ones of the plurality of requested client properties are available to be transmitted.

5. The method of claim 4, wherein said step of selecting further comprises expanding a wild card property.

6. The method of claim 4 further comprising:

prompting a user whether to transmit the selected ones of the plurality of requested client properties if it is determined that at least one of the selected ones of the plurality of requested client properties is available to be transmitted; and transmitting the request without at least one of the selected ones of the plurality of requested client properties if the user indicates the selected ones of the plurality of requested client properties are not to be sent.

7. The method of claim 4, further comprising the step of terminating the request if it is determined that at least one of the selected ones of the plurality of requested client properties is not available to be transmitted and the at least one of the selected ones of the plurality of requested client properties that is not available to be transmitted is a mandatory property.

8. The method of claim 1, wherein at least one of the plurality of requested client properties is associated with hardware characteristics of the client.

9. The method of claim 1, wherein the plurality of requested client properties included in a list in the link element are less than all client properties that may be included in the list.

10. The method of claim 1, wherein the inserted at least one of said plurality of client properties is less than all the plurality of requested properties included in the link element.

11. In a networked environment, a method, performed in a hardware processor, for designating client properties comprising:

receiving a link element associated with a server, the link element including a plurality of requested client properties;

selecting said link element to request a document identified by the link element to be transmitted to a client; and inserting at least one of said plurality of requested client properties into the request so as to allow customization of the requested document identified by the link element based on the inserted at least one of said plurality of requested client properties, wherein said plurality of requested client properties includes at least one property that is designated as a mandatory property and at least one property that is an optional property.

12. The method of claim 11, further comprising transmitting the request without at least one of the at least one property that is an optional property irrespective of whether the optional property is available for transmission.

13. In a networked environment, a system for designating client properties comprising:

means for receiving a link element associated with a server, the link element including a plurality of requested client properties;

means for selecting said link element to request a document identified by the link element to be transmitted to a client; and means for inserting at least one of said plurality of requested client properties into the request so as to allow customization of the requested document identified by the link element based on the inserted at least one of said plurality of requested client properties.

14. The system of claim 13, wherein said plurality of requested client properties is contained within an attribute of said link element.

15. The system of claim 13, wherein said plurality of requested client properties includes at least one property that is a wild card.

16. The system of claim 13, wherein said means for inserting comprises:

means for selecting ones of the plurality of requested client properties included in the link element; and means for determining whether selected ones of the plurality of requested client properties are available to be transmitted.

17. The system of claim 16, wherein said means for selecting further comprises means for expanding a wild card property.

18. The system of claim 16 further comprising:

means for prompting a user whether to transmit the selected ones of the plurality of requested client properties if it is determined that at least one of the selected ones of the plurality of requested client properties is available to be transmitted; and means for transmitting the request without at least one of the selected ones of the plurality of requested client properties if the user indicates the selected ones of the plurality of requested client properties are not to be sent.

19. The system of claim 16, further comprising means for terminating the request if it is determined that at least one of the selected ones of the plurality of requested client properties is not available to be transmitted and the at least one of the selected ones of the plurality of requested client properties that is not available to be transmitted is a mandatory property.

20. The system of claim 13, wherein at least one of the plurality of requested client properties is associated with hardware characteristics of the client.

21. The system of claim 13, wherein the plurality of requested client properties included in a list in the link element are less than all client properties that may be included in the list.

22. The system of claim 13, wherein the inserted at least one of said plurality of client properties is less than all the plurality of requested properties included in the link element.

23. In a networked environment, a system for designating client properties comprising:

means for receiving a link element associated with a server, the link element including a plurality of requested client properties;

means for selecting said link element to request a document identified by the link element to be transmitted to a client; and means for inserting at least one of said plurality of requested client properties into the request so as to allow customization of the requested document identified by the link element based on the inserted at least one of said plurality of requested client properties, wherein said plurality of requested client properties includes at least one property that is designated as a mandatory property and at least one property that is an optional property.

24. The system of claim 23, further comprising means for transmitting the request without at least one of the at least one property that is an optional property irrespective of whether the optional property is available for transmission.

25. In a networked environment, a computer program product recorded on a non-transitory computer readable storage medium for designating client properties comprising:

non-transitory computer readable storage medium means for receiving a link element associated with a server, the link element including a plurality of requested client properties;

non-transitory computer readable storage medium means for selecting said link element to request a document identified by the link element to be transmitted to a client; and non-transitory computer readable storage medium means for inserting at least one of said plurality of requested client properties into the request so as to allow customization of the requested document identified by the link element based on the inserted at least one of said plurality of requested client properties.

26. The program product of claim 25, wherein said plurality of requested client properties is contained within an attribute of said link element.

27. The program product of claim 25, wherein said plurality of requested client properties includes at least one property that is a wild card.

28. The program product of claim 25, wherein said non-transitory computer readable storage medium means for inserting comprises:

non-transitory computer readable storage medium means for selecting ones of the plurality of requested client properties included in the link element; and non-transitory computer readable storage medium means for determining whether selected ones of the plurality of requested client properties are available to be transmitted.

29. The program product of claim 28, wherein said non-transitory computer readable storage medium means for selecting further comprises non-transitory computer readable storage medium means for expanding a wild card property.

30. The program product of claim 28 further comprising:
non-transitory computer readable storage medium means for prompting a user whether to transmit the selected ones of the plurality of requested client properties if it is determined that at least one of the selected ones of the plurality of requested client properties is available to be transmitted; and non-transitory computer readable storage medium means for transmitting the request without at least one of the selected ones of the plurality of requested client properties if the user indicates the selected ones of the plurality of requested client properties are not to be sent.

31. The program product of claim 28, further comprising non-transitory computer readable storage medium means for terminating the request if it is determined that at least one of the selected ones of the plurality of requested client properties is not available to be transmitted and the at least one of the selected ones of the plurality of requested client properties that is not available to be transmitted is a mandatory property.

32. The program product of claim 25, wherein at least one of the plurality of requested client properties is associated with hardware characteristics of the client.

33. The program product of claim 25, wherein the plurality of requested client properties included in a list in the link element are less than all client properties that may be included in the list.

34. The program product of claim 25, wherein the inserted at least one of said plurality of client properties is less than all the plurality of requested properties included in the link element.

35. In a networked environment, a computer program product recorded on a non-transitory computer readable storage medium for designating client properties comprising:

non-transitory computer readable storage medium means for receiving a link element associated with a server, the link element including a plurality of requested client properties;

non-transitory computer readable storage medium means for selecting said link element to request a document identified by the link element to be transmitted to a client; and non-transitory computer readable storage medium means for inserting at least one of said plurality of requested client properties into the request so as to allow customization of the requested document identified by the link element based on the inserted at least one of said plurality of requested client properties, wherein said plurality of requested client properties includes at least one property that is designated as a mandatory property and at least one property that is an optional property.

36. The program product of claim 35, further comprising non-transitory computer readable storage medium means for transmitting the request without at least one of the at least one property that is an optional property irrespective of whether the optional property is available for transmission.

* * * * *